UNITED STATES PATENT OFFICE.

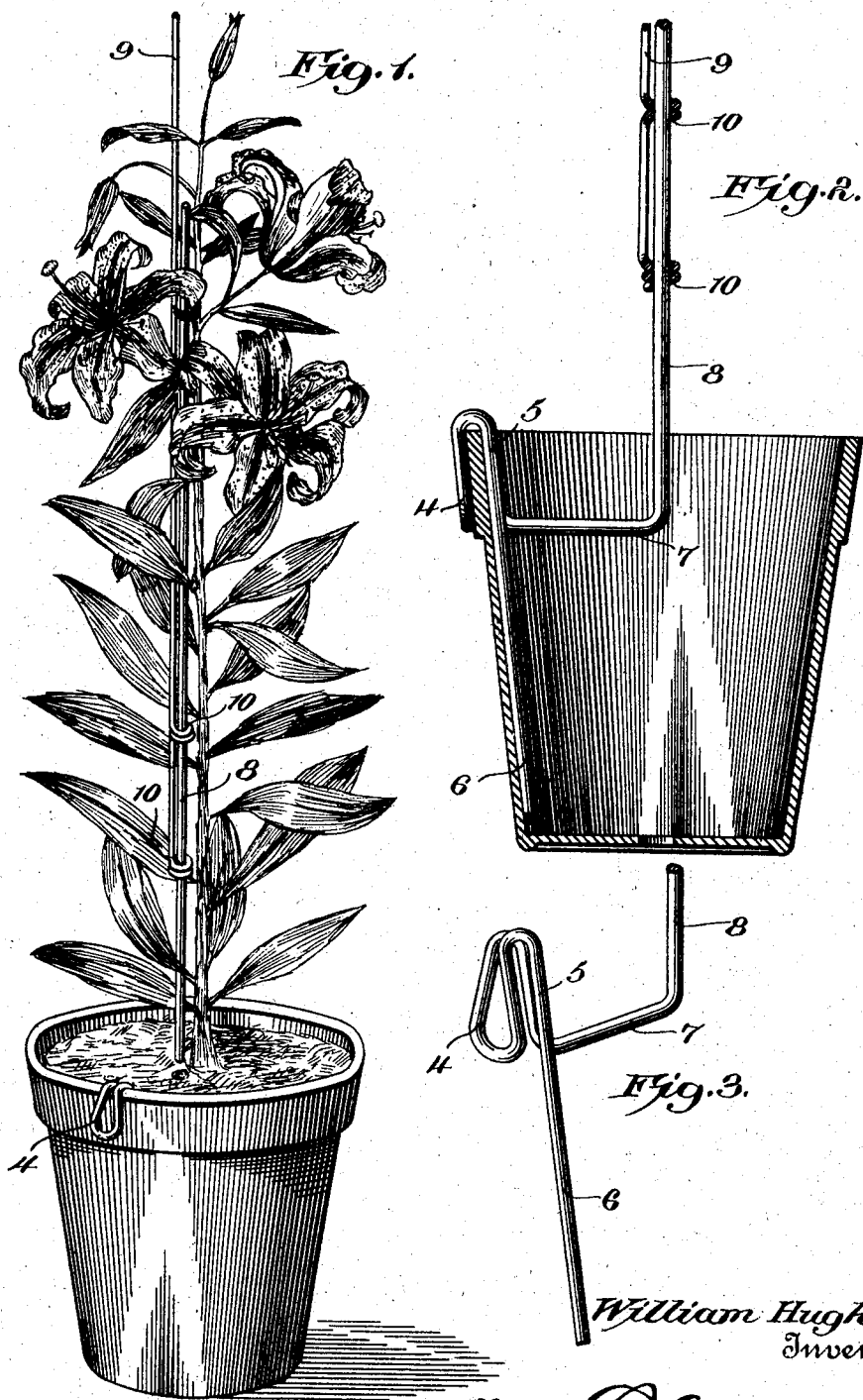

WILLIAM HUGHES, OF UPLAND, PENNSYLVANIA.

PLANT-SUPPORT.

No. 796,214.      Specification of Letters Patent.      Patented Aug. 1, 1905.

Application filed September 13, 1904. Serial No. 224,302.

*To all whom it may concern:*

Be it known that I, WILLIAM HUGHES, a citizen of the United States, residing at Upland, in the county of Delaware and State of Pennsylvania, have invented a new and useful Plant-Support, of which the following is a specification.

This invention relates to improvements in means for supporting plants growing in pots; and the object is to provide a simple article of manufacture which can be readily made, easily applied to a pot, will not injure the bulb or roots of a plant contained therein, and is capable of being extended to properly coöperate with plants of different heights.

The preferred embodiment of the invention is illustrated in the accompanying drawings, wherein—

Figure 1 is a perspective view of a pot and plant growing therein, showing the latter supported by the improved device. Fig. 2 is a sectional view through the pot and through a portion of the support, the upper end thereof being broken off. Fig. 3 is a detail perspective view of the lower portion of the support.

Similar reference-numerals indicate corresponding parts in all the figures of the drawings.

In the embodiment illustrated the main body of the support is formed of a single wire and is provided with a pair of pot-engaging jaws the outer of which is in the form of a loop 4, said loop tapering toward its upper end, or, in other words, the side elements or arms of said loop converging toward the upper end of the loop and the arms thereof being doubled over to form an inner jaw 5. One of these arms is extended downwardly at an inclination constituting a stem 6, while the other is inset, as shown at 7, and carries at its upper end a vertical standard 8. This standard for short plants may be made of sufficient height in itself, but for taller ones or those growing an extension is provided in the form of a shank 9, located longitudinally along one side of the stem and formed of wire, the shank being preferably of less diameter than the standard. The lower end of said shank is bent to form spaced coils constituting eyes 10, that are slidably mounted upon the standard, being in frictional engagement therewith, so that they will remain at any height placed.

In placing the device the stem itself is forced downwardly into the soil of the pot against one wall of the same until the jaws 4 and 5 embrace the rim. The standard will then be located at substantially the center of the pot, and to the same the plant may be tied, the shank 9 being raised to any height desired, or, if necessary, this shank can be detached. On account of the arm 7 being disposed below the plane of the upper ends of the jaws 4 and 5 the said arm can be covered with earth, so that it will not appear. Therefore the only exposed portion will be the standard and the outer jaw.

It will be evident that this device can be manufactured very cheaply and is easily applicable to the pot. It obviates the necessity of penetrating the soil at the center of the pot, and thereby avoids the danger of piercing the bulb or injuring the roots directly below the stem of the plant.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

A plant-support composed of a single wire bent to form a pair of pot-embracing jaws, the outer of which is in the form of a loop, the side elements of said loop being doubled over to form an inner jaw and being located side by side, one of said members being extended to form a stem, the other member being bent and extended inwardly forming an inset arm, and an integral and upstanding plant-supporting stem located at the inner end of said arm.

In testimony that I claim the foregoing as my own I have hereto affixed my signature in the presence of two witnesses.

WILLIAM HUGHES.

Witnesses:
    ROBERT J. CLUELOW,
    CHARLES YOUNG.